Dec. 6, 1949     A. A. BERNARD     2,490,023
WELDING ELECTRODE
Filed Feb. 26, 1947     2 Sheets-Sheet 1
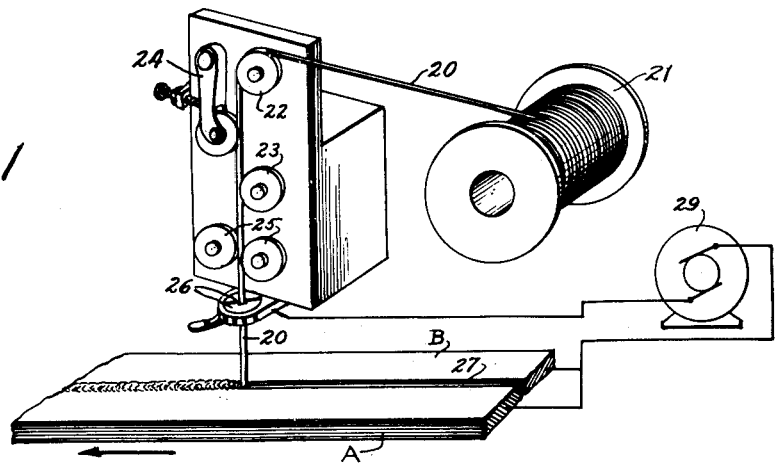
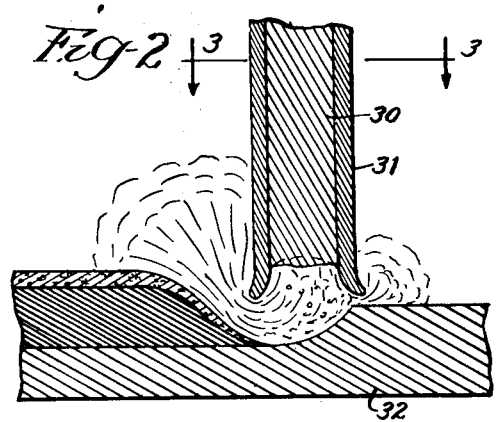
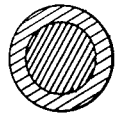
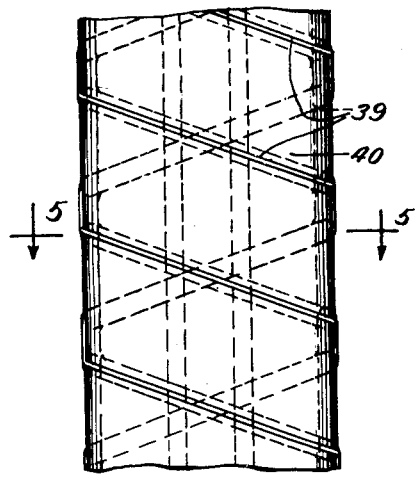
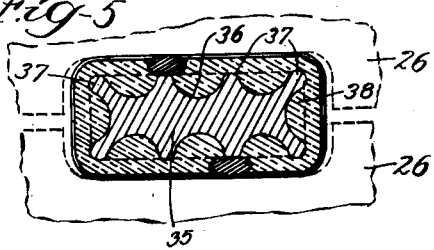
Inventor
Arthur A. Bernard
By: Mann and Brown
Attys.

Dec. 6, 1949  A. A. BERNARD  2,490,023
WELDING ELECTRODE
Filed Feb. 26, 1947  2 Sheets-Sheet 2
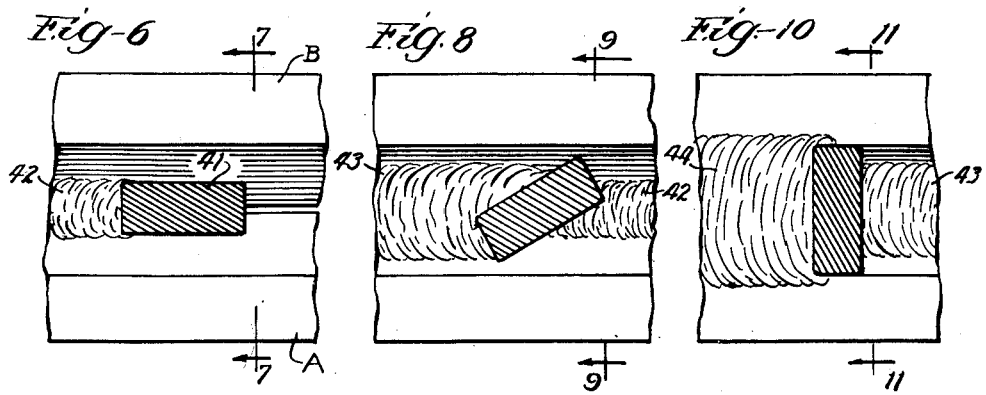
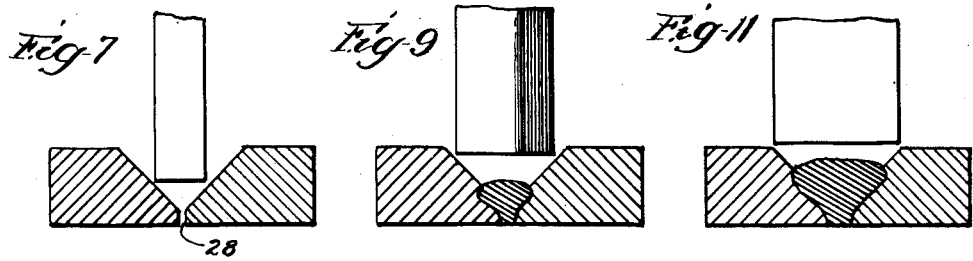
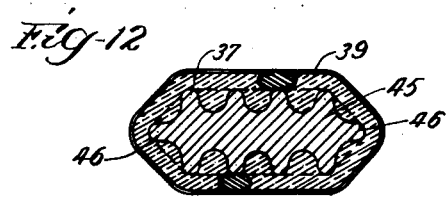
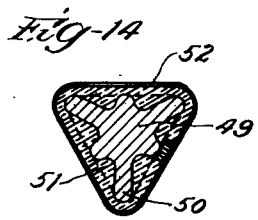
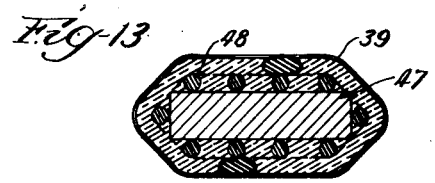
Inventor
Arthur A. Bernard.
By:- Mann and Brown
Attys Patented Dec. 6, 1949

2,490,023

UNITED STATES PATENT OFFICE 2,490,023

WELDING ELECTRODE

Arthur A. Bernard, Chicago, Ill., assignor to National Cylinder Gas Company, a corporation of Delaware Application February 26, 1947, Serial No. 730,995

16 Claims. (Cl. 219—8)

My invention relates to welding electrodes, and particularly those of indeterminate length used in automatic welding equipment. The invention disclosed herein is an improvement over the shielded arc welding electrode disclosed in my earlier applications Ser. No. 506,250, filed October 14, 1943, now abandoned; Ser. No. 591,691, filed May 3, 1945, now abandoned; and Ser. No. 660,331, filed April 8, 1946, the disclosures of these prior applications being specifically incorporated herein by reference to the extent that they are consistent with the present disclosure. The latter application has matured into Patent No. 2,430,701, issued November 11, 1947.

In manual electrodes, i. e., those of relatively short length, which are gripped at one end to feed the welding current through the core to the arc, it is relatively simple to achieve an inverted crucible type arc by merely providing a heavy flux coating over the electrode core, the coating melting at a slower rate than the metal core thereby leaving depending walls of flux to shield and confine the arc. The weld made with an electrode providing an inverted crucible type arc is generally of better quality than one produced by an electrode not having this characteristic, because the inverted crucible confines the arc to a relatively small zone and directs its energy to the adjacent base metal of the parts being welded.

Where the electrode can be gripped with electrical contacts on a bare end, opposite the end being used to draw the arc, there is no difficulty in feeding the electrical current to the core metal. In the case of welding machines, however, where the electrode wire may be several hundred feet in length, it is impractical to have the welding current flow through the entire length of wire because of the electrical resistance of the core. Also the flux used for the coating is a poor conductor of electricity, which makes it necessary to provide some means of direct electrical contact with the core of the welding electrode as it passes from the reel, as, for example, by milling a groove in the flux and affording access to the core by a contact which projects into the milled groove.

Another serious difficulty encountered in providing a continuous wire electrode for use with automatic welding machines resides in the fact that the flux coatings are generally brittle and will not stand any substantial flexing, such as encountered when the welding wire is unrolled from the reel and straightened for use in the welding operation.

It is, therefore, an object of the present invention to provide a welding electrode particularly suitable for, though not necessarily limited in its use to, automatic welding equipment, and in which the welding arc is of the inverted crucible type to produce quality welds.

In making what is known as V-butt welds with automatic welding machinery, it is customary to employ automatic welding wire that is circular in cross-section, and the diameter of the wire must be small enough so that on the first pass over the parts to be welded the electrode can be positioned near the bottom of the V to provide the required distance between the electrode and base metal for best welding conditions. As the weld is built up in the V joint it is necessary either to reciprocate the electrode transversely while continuously moving the work relative to the electrode, or to make a series of parallel passes for the same purpose. Not only is this time consuming but obviously the quality of the weld is affected by this procedure.

In the preferred forms of my invention I overcome these difficulties by making the electrode of generally oblong cross-section so that on the first pass over the V-butt joint the electrode may be positioned with its longest dimension parallel to the line of weld and as the weld is built up the electrode may be rotated through suitable angles to present an increasingly greater width of electrode to the increasing width of the weld seam that is to be laid down; and it is, therefore, another object of this invention to provide an electrode having this useful characteristic.

Other objects of the invention include the following: to provide a good electrical contact to the core of the electrode from the surface of the flux sheath without substantially destroying the continuity of the flux sheath; to accomplish this purpose by forming longitudinal ribs on the core and spirally winding a conductor over the ribs for external electrical contact; to stress the spiral conductor in such a manner that it has a natural tendency to resist unwinding as the electrode is consumed during the welding operation; to so interlock the flux layer under the spiral conductor, as well as to make the spiral winding a structural part of the flux sheath, that the construction will retain the flux securely in place and eliminate the tendency of the sheath to flake off as the welding rod is wound upon or unwound from the reels upon which it is handled; to provide a maximum area of electrical contact for the spiral conductor in relation to the cross-sectional area of the core, thereby reducing the electrical resistance at the point of contact; to provide an electrode which will permit the maintenance of a short arc deep within the area bounded by the scarfs of a V-butt joint, and at the same time deposit metal from a sufficiently large area of core metal that the relative rate of travel of the welding head in relation to the work being welded may be reasonably fast; to provide an electrode for automatic welding machines that will allow the production of welds of varying widths within a predetermined range; and to provide an electrode in which the core may be readily fabricated in rolling or drawing dies.

Further and other objects and advantages will become apparent as the disclosure proceeds and the description is read in conjunction with the accompanying drawings in which:

Fig. 1 is a diagrammatic view of an automatic welding head supplied with electrode from a spool or reel and positioned for welding over a scarfed butt-joint;

Fig. 2 is a longitudinal cross-sectional view of a shielded electrode producing an arc of the inverted crucible type;

Fig. 3 is a section on the line 3—3 of the electrode shown in Fig. 2;

Fig. 4 is an elevation of a preferred form of my improved electrode;

Fig. 5 is a sectional view of the electrode shown in Fig. 4, the section being taken along the line 5—5 of that figure;

Fig. 6 is a plan view of an electrode positioned over a scarfed butt-joint, and shows the pool of deposited metal in the path traveled by the electrode;

Fig. 7 is a sectional view of the butt-joint electrode of Fig. 6;

Fig. 8 is a plan view of the electrode of Fig. 6, after having been rotated through an angle of 30°, making a second pass weld of the butt-joint shown in Fig. 6;

Fig. 9 is a sectional view of the electrode positioned as shown in Fig. 8, the section being taken on the line 9—9 of Fig. 8;

Fig. 10 is a plan view of the electrode, now having been rotated through an angle of 90° from the position illustrated in Fig. 6 and in the process of making a third pass weld over the metal deposited by the electrode as positioned in Fig. 8;

Fig. 11 is a sectional view of the butt-joint and electrode shown in Fig. 10, the section being taken on the line 11—11 of that figure; and Figures 12–14 inclusive are cross-sectional views showing modifications of my invention.

In compliance with section 4888 of the revised statutes I shall now describe certain preferred forms of the invention, but it is to be understood that the invention may be variously embodied within the scope of the appended claims.

The invention is particularly applicable to automatic welding equipment of the type employing continuous electrode wire, as shown in Fig. 1, in which the automatic wire or electrode is indicated at 20, wound upon a spool or reel 21, and being threaded over guide wheels 22 and 23 between which the wire is subjected to a reverse bending operation by an adjustable wire straightening roll 24, after which the wire is fed by power rollers 25 through electrical contact blocks 26 to the welding area. Normally the rate of electrode feed is automatically governed by variations in arc voltage or by other suitable criteria. Inasmuch as the present invention is concerned only with the electrode wire and its method of fabrication, further description of the welding equipment, per se, is unnecessary.

In the making of a V type butt-joint weld between relatively heavy parts, the edges to be joined are beveled, as in Figs. 1, 7, 9 and 11, to form a V groove, generally designated 27, with a narrow throat portion 28 at the bottom or apex of the groove. The two parts to be joined (here indicated as A and B) are connected to one side of the power source, shown in Fig. 1 as a generator 29, and the other side is connected to the contact block 26 so that a potential is established between the welding electrode and the work pieces A and B.

The usual practice is to have the work pieces A and B mounted on a traveling platform which is moved relative to the electrode 20 at a predetermined and controlled speed.

Experience has taught that the best quality welds may be achieved when the welding arc is enclosed within an inverted crucible which serves not only to draw the arc to the base metal but also to exclude the atmosphere from the welding zone and to retain the inert gases generated by the flux material about the welding arc. This is illustrated in Figs. 2 and 3, which show a conventional manual electrode having a core 30 provided with a relatively heavy sheath 31 of flux coating. After the arc has been struck and the electrode 20 is moved relative to the work, the lower part of the flux sheath serves as the perimetrical wall of the inverted crucible defined by the flux sheath itself and the lower end of the core 30 which has melted away at a more rapid rate than the flux coating, as shown in Fig. 2.

The flux coating, which may be of any suitable composition of which many are known in the art, tends to exclude the atmosphere from the welding zone and to protect the newly deposited metal from the deteriorating effects of the atmosphere.

In the preferred form of my invention shown in Figs. 4 and 5, not only the core of the electrode but also the electrode itself is generally oblong in cross-section. The core consists of a rod which is rolled or drawn to form a plurality of longitudinally extending grooves 36 therein bounded by ribs 37. An imaginary line joining the outermost portions of these ribs forms a rectangle of which substantially more than one-half constitutes a boundary of the grooves or spaces between the ribs to provide a relatively large area for the retention of the flux coating 38. The core 35 may be of any suitable material depending upon the nature of the weld desired, and the material being welded, and after it has been drawn and rolled to shape it is spirally wound with one or more conductors 39 (in this case two conductors) to provide a series of flux-retaining spaces 40 between adjacent turns of the conductor, which spaces overlie the ribs 37 and the grooves or spaces 36 therebetween. After the core has been spirally wrapped with the conductor or conductors 39, the flux coating 38 is applied to a depth which leaves exposed but a slight portion of the conductors 39 so that electrical contact may be had with the contact blocks 26 to carry the welding current through the conductors 39 to the core of the electrode.

I have found that it is very important for successful welding to have the total amount of flux coating between .75 and 2.0 times the corresponding cross-sectional area of metal in the electrode, including both core and spiral conductor. I have found that it is also important to have not less than 30% of the total flux coating to lie within the grooves 36 and within the boundary of the rectangle defined by the extremities of the ribs 37. While these relations are important for achieving my objectives, it should be understood that the limitations may be exceeded with proportionately inferior results.

One of the important features of my invention resides in the manner in which the conductor 39 is applied to the core so that it will acquire a set and resist unwinding as the electrode is consumed during the welding operation. This is achieved first by employing a core having corners which are not substantially greater than right angles so that as the conductor is wrapped around the core the sharp bending of the conductor will stretch that portion of the conductor beyond its elastic limit to cause the conductor to take a set and resist unwinding as the electrode is consumed. The result is achieved further by tensioning the conductor as it is applied so as to assist the conductor in attaining the set as it is bent around the relatively sharp corners. The amount of tensioning applied will, of course, depend upon the particular metals employed in the core and the conductor.

It is also preferable to press the spiral conductor against the core during fabrication of the electrode, as by drawing it through a restricted die or by passing it through compression rollers whereby indentations or notches are formed in both the conductor and the ribs at their points of intersection.

At first thought it would seem that minimum tendency for the spiral strands to unwind as the electrode is consumed would be achieved by using a soft and highly pliable strand wire. It has been found, however, that when a relatively hard strand wire is wound spirally onto the core and is forced into engagement with the ribs of the core the strand will be stressed beyond its yield point wherever it intersects a core rib, the strand being "set" to its wound configuration by such over-stressing. Thus the strand wire may be wound onto the core under such high tensile stress as not only to cause the desired notching engagement with the ribs of the core but also to cause the desired "setting" of the strand wire. Producing the notches by radial pressure rather than by strand wire tension will also "set" the strand wire. After such setting occurs the stiffness of the strand wire is highly desirable since the stiffness results in substantial resistance to unwinding.

A satisfactory metal for both the strands and the electrode core is SAE 1010, in which the permissible range of carbon is eight to thirteen per cent.

Referring now to Figs. 6 to 11 inclusive, there is shown an application of the oblong electrode of Figs. 4 and 5 to the welding of a V-butt joint. The first pass of the electrode over the joint is done with the electrode (generally designated 41) in the position in which the long axis of the electrode is parallel to the butt joint and with the base of the electrode lying within the V joint closely adjacent to the throat 28, as shown in Fig. 7.

After the electrode 41 has laid down a seam 42 in this position the electrode may be rotated through an angle, say, of approximately 30° to lay down a second seam 43 of greater width, with the bore of the electrode not as far within the V groove. The final pass is then made with the electrode positioned 90° from the position it occupied on the first pass (see Figs. 10 and 11) to lay down a seam 44 which approximately equals the total width of the V joint. Obviously this method of welding of the V butt joint is faster and more economical than the conventional methods heretofore used, and produces a weld of better quality.

Modified forms of the electrode are shown in Figs. 12, 13 and 14. In Fig. 12 the core 45 of the electrode is provided with opposed ribs 46 in addition to the other ribs 37, so that as the conductor 39 is spirally wound about the core 45 it will be subjected to a bend of greater than 90° as it passes over the ribs 46, and the wrapping is done with sufficient tension on the conductor 39 so that it takes a permanent set in making the bend over the ribs 46. In other respects the electrode of Fig. 12 is the same as the electrode shown in Figs. 4 and 5, particularly with respect to the amount and distribution of the flux material.

In Fig. 13 the core 47 consists of a rectangular bar of metal about which are placed a number of wires or conductors 48 in positions which correspond to the ribs 37 and 46 of the electrode of Fig. 12. These wires or conductors 48 are firmly held in place, as, for example, by continuous or intermittent welding, to the rectangular core 47 as the conductor 39 is wound about the core in the same manner as previously described. The wires or conductors 48 run parallel to the longitudinal axis of the electrode and serve a somewhat similar function as the ribs 37 and 46 of the electrode shown in Fig. 12.

One advantage of a polygonal electrode (i. e., an electrode having three or more sides) is that for a given cross-sectional area there is greater perimetric surface for establishing electrical contact through contact blocks 26 than when the same cross-sectional area of electrode is embodied in a round electrode. In other words, for a given cross-sectional area of core material or welding metal it is desirable to have as large a perimeter as possible for conducting current from the exterior of the electrode to the core, and a polygon of three or more sides, particularly of the forms shown in Figs. 4, 12, 13 and 14, is well suited for this purpose.

The electrode shown in Fig. 14 has a generally triangular configuration with a core 49 provided with ribs 50 and intermediate grooves 51 to receive the flux material. The core is wound with a conductor 52 in the same manner as the electrode of Figs. 4 and 5 and the flux coating covers all but the extreme outer edges of the conductor 52.

It will be particularly noted that the conductor 52, in being spirally wound about the core 49, is bent to an acute angle at the three apexes of the triangular core and the conductor in this way is stretched beyond its elastic limit at the corners to thereby take a permanent set and prevent the conductor 52 from unwinding as the conductor is consumed during the welding.

Obviously a triangular electrode of the kind shown in Fig. 14 does not have the same advantage as the oblong electrodes of Figs. 5, 12 and 13, in so far as varying widths of weld are concerned, although it does provide maximum external contact area for the amount of core metal used. However, all of the polygonal shapes shown have the advantage of facilitating the maintenance of good electrical contact between the contact blocks 26 and the electrode, because of the flat contact surface which they provide, as distinguished from an arcuate surface.

The words "oblongitude" and "oblongitudinal," as used in the appended claims, are intended to be given a broad interpretation and to denote shapes deviating from the rectangular, including such elongated shapes as ellipses, etc.

I claim as my invention:

1. In a flexible welding electrode for producing an inverted crucible type arc and for use with a welding machine having contact jaws thereon for the conduction of welding current to the electrode, a metal core of substantially oblong cross-section having a plurality of integral and substantially continuous longitudinal ribs, a metal wire spirally wound on said core in contact with said ribs, a coating of flux material encasing said core and filling the spaces defined by said ribs and also the spaces between adjacent turns of said winding, whereby said flux material is interlocked under said metal wire in the spaces defined by said ribs, the periphery of said metal wire and flux coating as viewed in a plane normal to the longitudinal axis of the core being of substantially oblongitudinal configuration whereby the perimeter of the electrode available for contact with the jaws is greater than that of a circular electrode of the equivalent cross-sectional area, said metal wire being exposed on its outer surface to form a conducting path for the welding current from the surface thereof to the metal core, the continuity of said sheath around the surface of said core being broken by the contact of said spiral conductor with said ribs, but such contacts being spaced apart longitudinally of the core to afford sufficient continuity of flux around the electrode to permit said crucible to be formed around the arc.

2. In a flexible welding electrode for producing an inverted crucible type arc, a metal core of substantially oblong cross-section having a plurality of integral substantially continuous ribs, a metal wire spirally wound on said core in contact with said ribs, said wire being stiffer than annealed wire, at least some portions of said wire being stressed beyond the limit of elasticity of said wire, a coating of flux material encasing said core and filling the spaces defined by said ribs and also the spaces defined by said winding, said metal wire being exposed on the surface thereof to form a conducting path for the welding current from the surface thereof to the metal core.

3. In a flexible welding electrode of substantially oblong cross-section for producing an inverted crucible type arc and for use with a welding machine having contact jaws thereon for the conduction of welding current to the electrode, a metal core having a plurality of integral substantially continuous ribs, a metal wire spirally wound on said core in contact with said ribs, said wire being heat bonded to said ribs at spaced points, a coating of flux material encasing said core and filling the spaces defined by said ribs and also the spaces defined by said winding, whereby said flux material is interlocked under said metal wire in the spaces defined by said ribs, said metal wire being exposed on the surface thereof to form a conducting path for the welding current from the surface thereof to the metal core, the perimeter of said exposed metal wire available for contact with the jaws being greater than that of a circular electrode of equivalent cross-sectional area.

4. In a flexible welding electrode of oblong cross-section for producing an inverted crucible type arc and for use with a welding machine having contact jaws thereon for the conduction of welding current to the electrode, a metal core of substantially rectangular cross-section having a plurality of integral substantially continuous ribs forming grooves, a metal wire spirally wound on said core in contact with said ribs, the perimeter of said metal wire available for contact with the jaws being greater than that of the circular electrode of equivalent cross-sectional area, a coating of flux material encasing said core and filling the spaces defined by said ribs and also the spaces between adjacent turns of said winding, whereby said flux material is interlocked under said metal wire in the grooves defined by said ribs, the thickness of the flux above the outer edge of the ribs being substantially equal to or less than the thickness of said winding so that a maximum amount of flux covers the core without interfering with the electrical contact thereto, said coating being continuous around the periphery of said core over a major portion of the length of the electrode, the ratio of the cross-sectional area of said coating to the cross-sectional area of said core together with said spiral wire being between .75 and 2.0.

5. In a flexible welding electrode of oblong cross-section for producing an arc of the inverted crucible type, a metal core having a plurality of integral ribs, said ribs so positioned that an imaginary line connecting the outer edges of said ribs would be of generally rectangular configuration, a metal wire spirally wound about said ribs, said wire being stiffer than annealed wire, at least some portions of said wire being stressed beyond the elastic limit of said wire, a coating of flux material encasing said core and filling the spaces defined by said ribs and also the spaces between adjacent turns of said winding, said metal wire being exposed on the surface thereof to form a conducting path for the welding current from the surface thereof to the metal core.

6. In a flexible welding electrode of oblong cross-section for producing an arc of the inverted crucible type and for use with a welding machine having contact jaws thereon for the conduction of welding current to the electrode, a metal core having a plurality of generally longitudinal ribs defining spaces between said ribs, said ribs being so positioned that an imaginary line connecting the outer edges of said ribs in a plane transverse to that of the longitudinal axis of the core would be of generally oblongitudinal configuration and more than half of said line would be a boundary of the spaces defined by said ribs, a metal wire spirally wound about said core, a coating of flux material encasing and substantially filling the spaces defined by said ribs and also the spaces between adjacent turns of said windings, said windings being exposed at the surface thereof to form a conducting path with the welding current from the surface of said electrode to the core thereof, the periphery of said exposed windings available for contact with the jaws being greater than that of a circular electrode of the equivalent cross-sectional area.

7. In a flexible welding electrode for use with a welding machine having contact jaws thereon for the conduction of welding current to the electrode, a metal core of oblong configuration and having substantially continuous ribs forming grooves, at least one metal wire spirally wound about said ribs, a sheath of flux material occupying said grooves and the spaces between adjacent turns of said wire, said sheath being continuous around the periphery of said core over a major portion of the length of the electrode, the ratio of cross-sectional area of said sheath to the cross-sectional area of said metal core and wire being between .75 and 2.0, said spiral metal wire being exposed at the periphery thereof for electrical conduction to said core, the periphery of said wire and sheath as viewed in a plane normal to the longitudinal axis of said core being of substantially oblongitudinal configuration whereby the perimeter of the electrode available for contact with the jaws is greater than that of a circular electrode of equivalent cross-sectional area.

8. In a flexible welding electrode for use with a welding machine having contact jaws thereon for the conduction of welding current to the electrode, a metal core of oblong configuration and having substantially continuous ribs forming grooves, at least one metal wire spirally wound about said ribs, a sheath of flux material occupying said grooves and the spaces defined by said wire, at least 30% of the total cross-sectional area of said sheath lying within the oblongitude defined by the outer edges of said ribs, said spiral metal wire being exposed at the periphery thereof for electrical conduction to said core, the periphery of said wire and sheath as viewed in a plane normal to the longitudinal axis of said core being of substantially oblongitudinal configuration whereby the perimeter of the electrode available for contact with the jaws is greater than that of a circular electrode of equivalent cross-sectional area.

9. In a flexible welding electrode for use with a welding machine having contact jaws thereon for the conduction of welding current to the electrode, a metal core of oblong configuration and having substantially continuous ribs forming grooves, at least one metal wire spirally wound about said ribs, a sheath of flux material occupying said grooves and the spaces defined by said wire, the ratio of cross-sectional area of said sheath to the cross-sectional area of said metal core and wire being between .75 and 2.0 and at least 30% of the total cross-sectional area of said sheath lying within the oblongitude defined by the outer edges of said ribs, said spiral metal wire being exposed at the periphery thereof for electrical conduction to said core, the periphery of said wire and sheath as viewed in a plane normal to the longitudinal axis of said core being of substantially oblongitudinal configuration whereby the perimeter of the electrode available for contact with the jaws is greater than that of a circular electrode of equivalent cross-sectional area.

10. A flexible electrode for use in automatic welding equipment having contact jaws thereon for the conduction of welding current to the electrode comprising a core which in cross-section is oblong, said core having associated therewith a plurality of longitudinally extending ribs providing grooves therebetween, a conductor spirally wound about said core and ribs, a flux sheath on the core filling said grooves and the spaces between adjacent turns of said conductor but leaving a part of said conductor exposed to provide an external electrical contact for supplying current to the core through said conductor and ribs, at least thirty per cent of the total cross-sectional area of the sheath lying within the oblongitude defined by the outer edges of the ribs, the cross-sectional shape of the electrode as a whole being also oblong whereby relative rotation of the electrode about its longitudinal axis controls the width of the seam laid down by the electrode and whereby the perimeter of the electrode available for contact with the jaws is greater than that of a circular electrode of equivalent cross-sectional area.

11. In a flexible welding electrode for forming an arc enclosed by an inverted crucible, a metal core of generally polygonal cross-section having a plurality of substantially continuous ribs defining grooves, at least two of the interior angles of said polygonal cross-section being not substantially greater than right angles, a conductor spirally wound on said core crossing said ribs and grooves, said conductor being stiffer than annealed wire and being set to its wound configuration by being bent about said two interior angles, a coating of flux material encasing said core and filling said grooves and the spaces between adjacent turns of said conductor, said conductor being exposed on the outer surface thereof to conduct the welding current from said surface to said core, said electrode also being generally polygonal in cross-section.

12. In a flexible welding electrode for forming an arc enclosed by an inverted crucible and for use with a welding machine having contact jaws thereon for the conduction of welding current to the electrode, a metal core of generally oblong cross-section having a plurality of substantially continuous ribs, a spiral metal wire wound on said core in contact with said ribs, said wire and ribs having mutually engaging notches, a coating of flux material encasing said core and filling the spaces defined by said ribs and also the spaces defined by said winding, the spaces between said ribs being of such depth that at least thirty per cent of the total cross-sectional area of said coating lies within an oblongitude defined by the outer edges of said ribs, said metal wire being exposed on the surface thereof to form a conducting path for the welding current from the surface thereof to the metal core, the cross-sectional shape of the electrode as a whole being also oblong whereby the perimeter of the electrode available for contact with the jaws is greater than that of a circular electrode of the equivalent cross-sectional area.

13. In a flexible electrode for use with an arc welding machine having contact jaws thereon for the conduction of welding current to the electrode, a substantially oblong metal core having generally longitudinal ribs defining grooves between said ribs, a sheath of flux material occupying said grooves and overlying said ribs, said grooves being of such depth that at least thirty per cent of the total cross-sectional area of said sheath lies within an oblongitude defined by the outer edges of said ribs, and a metal conductor wound on said core to conduct welding current from the surface of the electrode through the sheath to the core, said ribs being in engagement with said conductor to resist shifting of the conductor longitudinally of the core, the cross-sectional shape of the electrode as a whole being also oblong whereby the perimeter of the electrode available for contact with the jaws is greater than that of a circular electrode of equivalent cross-sectional area.

14. In a flexible electrode for use with an arc welding machine having contact jaws thereon for the conduction of welding current to the electrode, a substantially oblong metal core having generally continuous ribs defining grooves between said ribs, a sheath of flux material occupying said grooves and overlying said ribs, and a metal conductor wound on said core to conduct welding current from the surface of the electrode through the sheath to the core, said ribs being in engagement with said conductor to resist shifting of the conductor longitudinally of the core, said conductor being stiffer than annealed wire and being stressed to become set to its wound configuration to resist unwinding.

15. In a flexible welding electrode for producing an inverted crucible about the arc and for use with a welding machine having contact jaws thereon for the conduction of welding current to the electrode, an oblong metal core with integral, substantially continuous ribs formed thereon, a flux sheath encasing said core to form the perimetrical wall of the inverted crucible, and a conductor spirally wound on said core to conduct welding current to the core, the periphery of said conductor and sheath being of substantially oblongitudinal configuration whereby the perimeter of the electrode available for contact with the jaws is greater than that of a circular electrode of equivalent cross-sectional area, said conductor being substantially embedded in said sheath to serve as a structural part of said wall, the said ribs defining grooves of sufficient depth to provide sufficient thickness of flux in the crucible wall between the arc and the spiral winding to retard melting of the winding thereby to conserve the structure of the crucible wall, said sheath being continuous around the periphery of said core over a major portion of the length of the electrode, the ratio of the cross-sectional area of said sheath to the cross-sectional area of said core together with said spiral conductor being between .75 and 2.0.

16. In a flexible welding electrode for use with a welding machine having contact jaws thereon for the conduction of welding current to the electrode, a metal core, a plurality of longitudinal conductors spaced about said core forming ribs, and defining grooves therebetween at least one conductor spirally wound on said ribs, a flux sheath encasing said core in the grooves defined by said conductors whereby said flux sheath is locked in place by said conductors, said grooves extending over more than half of the rectangle defined by the outer edges of said ribs, said spiral conductor being exposed on the surface thereof to form conducting paths through said conductors from said surface to said core, said conductors being of sufficient thickness to define spaces for a flux sheath of such thickness that an arc of the inverted crucible type will be formed during the welding operation, said electrode being of substantially rectangular cross-section whereby the perimeter of the electrode available for contact with the jaws is greater than that of a circular electrode of equivalent cross-sectional area.

ARTHUR A. BERNARD.

REFERENCES CITED

The following references are of record in the file of this patent:

UNITED STATES PATENTS

| Number | Name | Date |
|---|---|---|
| 1,873,847 | Miller | Aug. 23, 1932 |
| 1,944,753 | Mathias | Jan. 23, 1934 |
| 2,023,818 | Muller | Dec. 10, 1935 |
| 2,025,206 | Holslag | Dec. 29, 1935 |
| 2,430,701 | Bernard | Nov. 11, 1947 |

FOREIGN PATENTS

| Number | Country | Date |
|---|---|---|
| 292,318 | Great Britain | June 21, 1928 |
| 499,852 | Great Britain | Apr. 26, 1937 |